(12) United States Patent
Moody (10) Patent No.: US 11,778,077 B2
(45) Date of Patent: Oct. 3, 2023

(54) APPLICATION LAYER PAYLOAD OPTIMIZATION

(71) Applicant: Raytheon Company, Waltham, MA (US)

(72) Inventor: Calvin Lee Moody, Fate, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/360,195

(22) Filed: Jun. 28, 2021

(65) Prior Publication Data

US 2022/0417349 A1 Dec. 29, 2022

(51) Int. Cl.
| | |
|---|---|
| *H04L 69/329* | (2022.01) |
| *H04L 67/5651* | (2022.01) |
| *H04L 67/568* | (2022.01) |
| *H04L 69/22* | (2022.01) |
| *H04L 69/24* | (2022.01) |
| *H04L 69/04* | (2022.01) |

(52) U.S. Cl.
CPC .......... *H04L 69/329* (2013.01); *H04L 67/568* (2022.05); *H04L 67/5651* (2022.05); *H04L 69/22* (2013.01); *H04L 69/24* (2013.01)

(58) Field of Classification Search
None
See application file for complete search history.

(56) References Cited

U.S. PATENT DOCUMENTS

| | | | | |
|---|---|---|---|---|
| 8,959,155 | B1* | 2/2015 | Kwok | H04L 12/4633 709/205 |
| 2007/0043824 | A1* | 2/2007 | Fremantle | H04L 67/568 709/214 |
| 2011/0176556 | A1* | 7/2011 | Guo | H04L 1/1812 370/474 |
| 2011/0282932 | A1* | 11/2011 | Ramjee | H04L 67/1001 709/218 |

(Continued)

OTHER PUBLICATIONS

Title: "Cooperative End-to-End Traffic Redundancy Elimination for Reducing Cloud Bandwidth Cost" Inventor: Lei Yu et al. Publisher: IEEE Year: 2012 (Year: 2012).*

(Continued)

*Primary Examiner* — John A Follansbee
*Assistant Examiner* — Kamal M Hossain
(74) *Attorney, Agent, or Firm* — Daly, Crowley, Mofford & Durkee, LLP (57) ABSTRACT

A method comprising: obtaining an outbound message, the outbound message being an application-layer message; generating a plurality of first fingerprints based on the outbound message, each of the first fingerprints being generated based on a different portion of the outbound message; detecting, based on the plurality of first fingerprints, whether a first cached message is stored in a memory that matches the outbound message; when the first cached message is stored in the memory, including an identifier of the first cached message in the outbound message, replacing a first region of a payload of the outbound message with a first token, the first region of the payload of the outbound message includ- (Continued)

ing a sequence of bits that is also found the first cached message, and transmitting the outbound message to a remote device.

17 Claims, 7 Drawing Sheets

(56) References Cited

U.S. PATENT DOCUMENTS

| | | | |
|---|---|---|---|
| 2013/0268497 A1* | 10/2013 | Baldwin | G06F 3/0683 |
| | | | 707/E17.002 |
| 2013/0279524 A1 | 10/2013 | Guo et al. | |
| 2014/0003421 A1 | 1/2014 | Alicherry et al. | |
| 2014/0223030 A1* | 8/2014 | Bhaskar | H03M 7/3088 |
| | | | 709/247 |
| 2016/0119406 A1* | 4/2016 | Dentamaro | G06F 9/465 |
| | | | 709/204 |
| 2016/0179628 A1 | 6/2016 | Kolte et al. | |
| 2019/0207887 A1* | 7/2019 | Kasheff | H04L 51/212 |
| 2020/0167282 A1* | 5/2020 | Zaydman | H04L 67/5682 |

OTHER PUBLICATIONS

Search Report and Written Opinion dated Sep. 30, 2022 for PCT Application No. PCT/US2022/035105; 16 pages.
Bhavish et al., "EndRE: An End-System Redundancy Elimination Service for Enterprises", Microsoft Research India; t University of Wisconsin-Madison, Apr. 2010.

* cited by examiner

| SOURCE CACHE STRUCTURES |
|---|
| SRC_CACHE_1 209A |
| SRC_CACHE_2 209B |
| SRC_CACHE_3 209C |

211

| DESTINATION CACHE STRUCTURES |
|---|
| DESTINATION_CACHE_1 211A |
| DESTINATION_CACHE_2 211B |
| DESTINATION_CACHE_3 211C |

APPLICATION LAYER PAYLOAD OPTIMIZATION

BACKGROUND

A communications network is a group of computing devices interconnected by links that are used to transfer data. Communications networks can be used in various control contexts. They are frequently used in industrial control systems, aircraft control systems, as well as vehicular control systems. In addition, communications networks are frequently used to transmit used to transmit voice, video, as well as many other types of data. In many application contexts, the speed at which a communications network transmits data may be essential characteristic of the communications network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

According to aspects of the disclosure, a method for use in a computing device having a memory and a processor that is operatively coupled to the memory, the method comprising: obtaining an outbound message, the outbound message being an application-layer message, the outbound message being generated by an application that is executed by the processor; generating a plurality of first fingerprints based on the outbound message, each of the first fingerprints being generated based on a different portion of the outbound message; detecting, based on the plurality of first fingerprints, whether a first cached message is stored in the memory that matches the outbound message; when the first cached message is stored in the memory, including an identifier of the first cached message in the outbound message, replacing a first region of a payload of the outbound message with a first token, the first region of the payload of the outbound message including a sequence of bits that is also found the first cached message, and transmitting the outbound message to a remote device; and when the first cached message is not stored in the memory, transmitting the outbound message to the remote device, the outbound message being transmitted without replacing any portion of the payload of the outbound message with a token.

According to aspects of the disclosure, a system is provided, comprising: a memory; and a processor operatively coupled to the memory, the processor being configured to perform the operations of: obtaining an outbound message, the outbound message being an application-layer message, the outbound message being generated by an application that is executed by the processor; generating a plurality of first fingerprints based on the outbound message, each of the first fingerprints being generated based on a different portion of the outbound message; detecting, based on the plurality of first fingerprints, whether a first cached message is stored in the memory that matches the outbound message; when the first cached message is stored in the memory, including an identifier of the first cached message in the outbound message, replacing a first region of a payload of the outbound message with a first token, the first region of the payload of the outbound message including a sequence of bits that is also found the first cached message, and transmitting the output bound message to a remote device; when the first cached message is not stored in the memory, transmitting the outbound message to the remote device, the outbound message being transmitted without replacing any portion of the payload of the outbound message with a token.

According to aspects of the disclosure, a non-transitory computer-readable medium that is configured to store one or more processor-executable instructions, which, when executed by at least one processor, further cause the at least one processor to perform the operations of: obtaining an outbound message, the outbound message being an application-layer message, the outbound message being generated by an application that is executed by the processor; generating a plurality of first fingerprints based on the outbound message, each of the first fingerprints being generated based on a different portion of the outbound message; detecting, based on the plurality of first fingerprints, whether a first cached message is stored in a memory that matches the outbound message; when the first cached message is stored in the memory, including an identifier of the first cached message in the outbound message, replacing a first region of a payload of the outbound message with a first token, the first region of the payload of the outbound message including a sequence of bits that is also found the first cached message, and transmitting the outbound message to a remote device; when the first cached message is not stored in the memory, transmitting the outbound message to the remote device, the outbound message being transmitted without replacing any portion of the payload of the outbound message with a token.

BRIEF DESCRIPTION OF THE DRAWING FIGURES

Other aspects, features, and advantages of the claimed disclosure will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
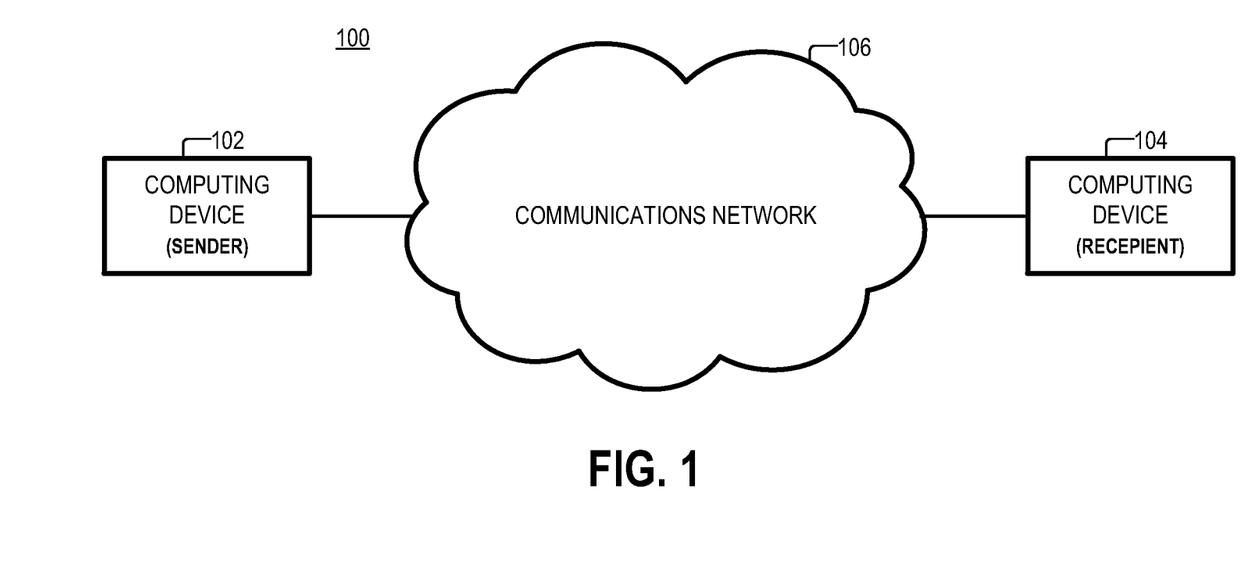
FIG. 1 is a diagram of an example of a communications system, according to aspects of the disclosure.

FIG. 1 is a diagram of an example of a system 100, according to aspects of the disclosure. As illustrated, the system 100 may include a computing device 102 that is coupled to a computing device 104 via a communications network 106. The computing device 102 may include one or more of a smartphone, a desktop computer, a laptop computer, a mission control computer, an electronic control unit (ECU), and/or any other suitable type of computing device.

The computing device 104 may include one or more of a smartphone, a desktop computer, a laptop computer, a mission control computer, an electronic control unit (ECU), and/or any other suitable type of computing device. The communications network 106 may include any suitable type of open or closed network. By way of example, the communications network 106 may include one or more of the Internet, a local area network (LAN), a wide area network (WAN), an InfiniBand network, an avionics network, a controller area network (CAN), and/or any other suitable type of communications network.

Figure 2:
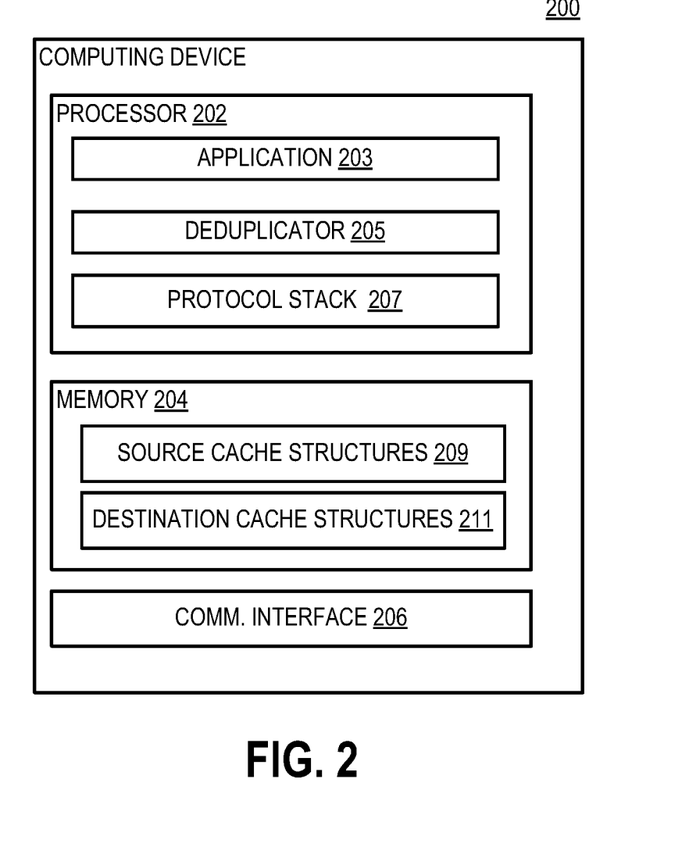
FIG. 2 is a diagram of an example of a computing device, according to aspects of the disclosure.

FIG. 2 is a diagram of an example of a computing device 200, according to aspects of the disclosure. The computing device 200 may be the same or similar to each of the computing device 102 and the computing device 104. The computing device 200 may include a processor 202, a memory 204, and a communications interface 206. The processor 202 may include one or more of a general-purpose processor (e.g., an x86-based processor or an ARM-based processor), a special-purpose processor, an application-specific integrated circuit (ASIC), a field-programmable gate array (FPGA), and/or any other suitable type of processing circuitry. The memory 204 may include any suitable type of volatile or non-volatile memory. By way of example, the memory 204 may include one or more of a flash memory, an Electrically Erasable Programmable Read-Only Memory (EEPROM), a Synchronous Dynamic Random-Access Memory (SDRAM), a solid-state drive (SSD), and/or any other suitable type of memory. The communications interface 206 may include one or more of an Ethernet interface, a Bluetooth Interface, an InfiniBand Interface, and/or any suitable type of communications interface.

The processor 202 may be configured to execute an application 203, a deduplicator 205, and a protocol stack 207. Application 203 may include any suitable type of application that is configured to: (i) transmit one or more messages to another application that is executed on another computing device, and/or (ii) receive and process one or more messages from the other application. Each of the messages may be received or transmitted via communications network 106. The protocol stack 207 may be an implementation of a computer networking protocol suite or protocol family for transmitting messages generated by application 203 and receiving messages destined for application 203. In some implementations, the protocol stack 207 may implement the Open Systems Interconnection model (OSI) model. Additionally or alternatively, in some implementations, the protocol stack 207 may include an application layer, a presentation layer, a session layer, a transport layer, a network layer, and a physical layer. However, it will be understood that the present disclosure is not limited to any specific implementation of the protocol stack 207.

The deduplicator 205 may include software that is configured to deduplicate inbound and outbound messages. Each of the outbound messages may include a message that is generated by application 203 for transmission (via communications network 106) to another application that is executed on a different computing device. In some implementations, the deduplicator 205 may deduplicate outbound messages in accordance with a process 400, which is discussed further below with respect to FIG. 4. Each of the inbound messages may include a message that is destined for application 203 and transmitted by another application that is executed on a different computing device. In some implementations, the deduplicator 205 may deduplicate inbound messages in accordance with a process 500, which is discussed further below with respect to FIG. 5.

Figure 3:
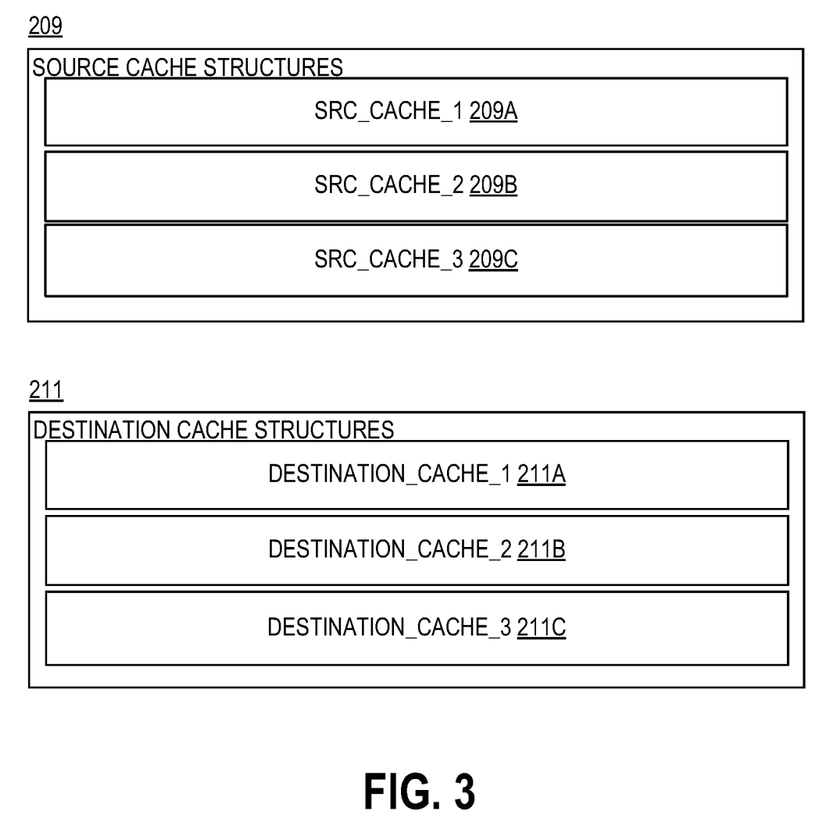
FIG. 3 is a diagram of an example of different cache structures, according to aspects of the disclosure.

Although in the example of FIG. 3 the deduplicator 205 is implemented in software, alternative implementations are possible in which the deduplicator 205 is implemented in hardware or as a combination of hardware and software. Although in the example of FIG. 3 the deduplicator is depicted as being separate from application 203 and the protocol stack 207, it will be understood that in some implementations the deduplicator 205 may be integrated into either one (or both) of application 203 and the application layer of the protocol stack 207. As is discussed further below, the deduplicator 205 is configured to deduplicate application-layer messages.

The memory 204 may be configured to store source cache structures 209 and destination cache structures 211. According to the present example, the destination cache structures 211 are configured to cache outbound messages and the source cache structures 209 are configured to cache inbound messages. Although in the example of FIG. 2 different cache structures are used to store inbound and outbound messages, it will be understood that alternative implementations are possible in which inbound and outbound messages are stored in the same cache structure or the same set of cache structures. Stated succinctly, the present disclosure is not limited to any specific implementation of structures that are used for caching inbound and outbound messages.

FIG. 3 shows an example of the source cache structures 209, in accordance with one implementation. As illustrated, the cache structures 209 may include cache structures 209A-C. Each of the cache structures 209A, 209B, and 209C may include a different memory space, a different file, or a different object. Each of the cache structures 209A, 209B, and 209C may be configured to store inbound application layer messages that are received from a different source. Each of the cache structures 209A, 209B, and 209C may be configured to store only inbound application layer messages that are received from the same source. As used throughout the disclosure, the phrase "source of an application-layer message" may refer to an application that has generated the application-layer message, a device on which the application is executed, or an information flow in which the application participates and the message is part of. An information flow may include an authentication handshake or another message exchange that is performed for a particular purpose.

In some implementations, each of the cache structures 209A-C may store messages that are generated by a different application. In some instances, at least two of cache structures 209A-C may store messages generated by different applications that are executed on the same device. Additionally or alternatively, in some implementations, each of the cache structures 209A-C may store messages that are part of different flows. In some instances, at least two of cache structures 209A-C may store messages that are part of different flows of the same application (i.e., flows that are performed by the same remote application). Additionally or alternatively, in some implementations, each of the cache structures 209A-C may store messages that are generated by a different computing device.

FIG. 3 further shows an example of the destination cache structures 211, in accordance with one implementation. As illustrated, the destination cache structures 211 may include cache structures 211A-C. Each of the destination cache structures 211A, 211B, and 211C may include a different memory space, a different file, or a different object. Each of the destination cache structures 211A, 211B, and 211C may be configured to store outbound application layer messages that are destined for a different destination. Each of the destination cache structures 211A, 211B, and 211C may be configured to store only outbound application layer messages that are destined for the same destination. As used throughout the disclosure, the phrase "destination of an application-layer message" may refer to an application to which the message is transmitted, a device on which the application is executed, or an information flow in which the application participates and the message is part of.

In some implementations, each of the cache structures 211A-C may store messages that are destined for a different application. In some instances, at least two of cache structures 211A-C may store messages destined for different applications that are executed on the same device. Additionally or alternatively, in some implementations, each of the cache structures 211A-C may store messages that are part of different flows. In some instances, at least two of cache structures 211A-C may store messages that are part of different flows of the same application (i.e., flows that are performed by the same remote application). As yet another example, each of the cache structures 211A-C may store messages that are destined for different computing devices.

Although the cache structures 209 include three cache structures, it will be understood that the cache structures 209 may be include any number of cache structures. Furthermore, as is discussed further below, each of the cache structures 209 may also store one or more fingerprints of each message that is stored in the cache structure 209. Although the cache structures 211 include three structures, it will be understood that the cache structures 211 may be include any number of cache structures. Furthermore, as is discussed further below, each of the cache structures 211 may also store one or more fingerprints of each message that is stored in the cache structure 211.

Figure 4:
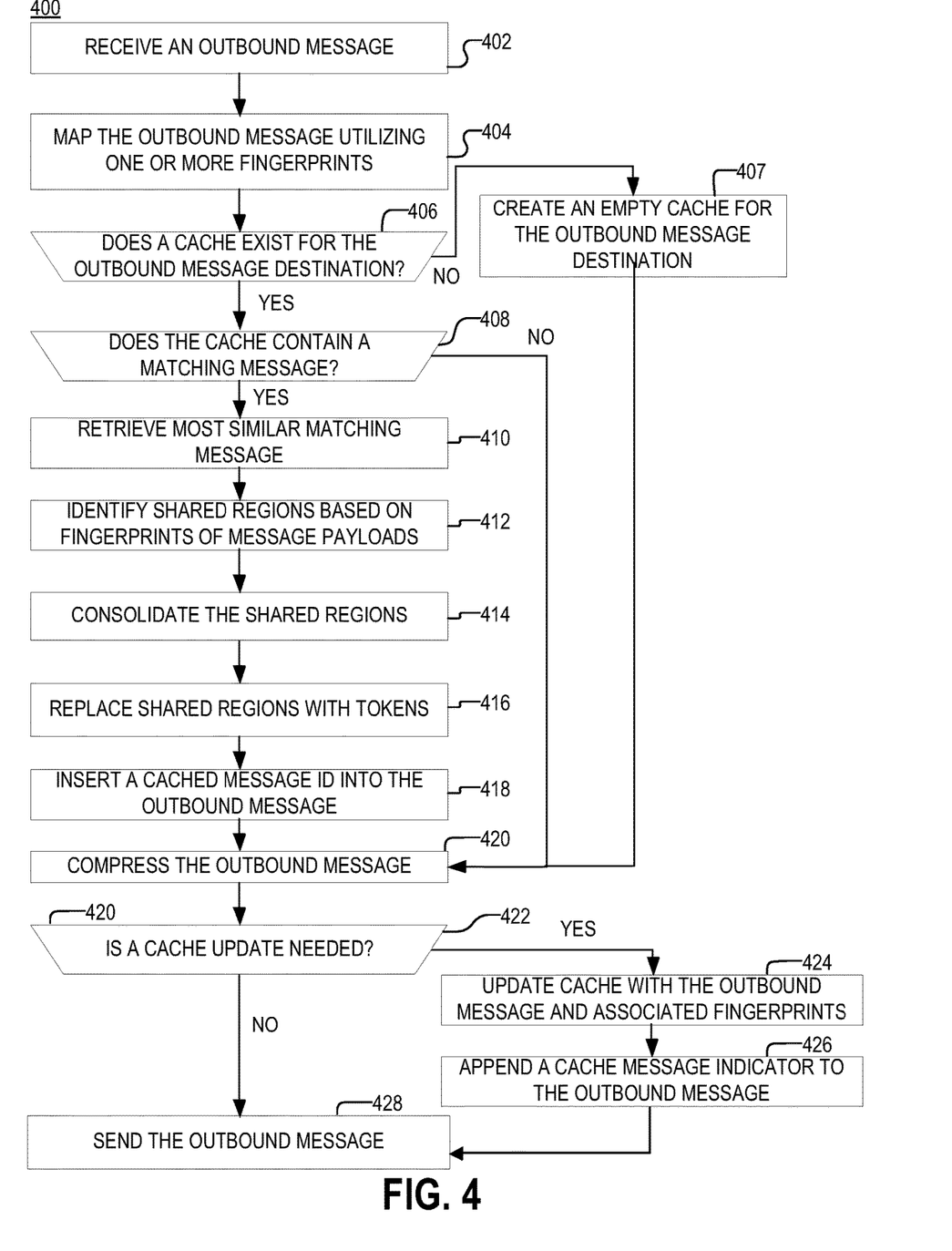
FIG. 4 is a flowchart of an example of a process, according to aspects of the disclosure.

FIG. 4 is a flowchart of an example of a process 400, according to aspects of the disclosure.

At step 402, the deduplicator 205 receives an outbound message. The outbound message is an application layer message. The outbound message is generated by application 203.

At step 404, the deduplicator 205 generates a plurality of fingerprints of the outbound message. In some implementations, each of the fingerprints may be generated by using a rolling hashing function. Additionally or alternatively, in some implementations, each of the fingerprints may be a Rabin fingerprint. Additionally or alternatively, in some implementations, each of the fingerprints may be generated based on a different region of the payload of the outbound message.

At step 406, the deduplicator 205 detects if a cache structure 211 is available in the memory 204, which is associated with the destination of the outbound message. For example, the deduplicator 205 may detect if a cache structure 211 is available, which caches only messages that are destined for the same destination as the outbound message. If a cache structure 211 is available in the memory 204, which is associated with the destination of the outbound message, the process 400 proceeds to step 408. Otherwise, the process 400 proceeds to step 407.

At step 407, the deduplicator 205 creates an empty cache structure 211, which is associated with the destination of the outbound message.

At step 408, the deduplicator 205 detects if the cache structure (identified at step 406) contains one or more cached messages that match the outbound message (received at step 402). According to the present example, a cached message matches the outbound message if a predetermined number of the fingerprints of the outbound message (generated at step 404) match the fingerprints of the cached message. As noted above, the fingerprints of a cached message may be stored in the same cache structure as the cached message. More particularly, at step 408, for each (or at least one) of the cached messages in the cache structure, deduplicator 205 detects if any of the fingerprints of the outbound message (generated at step 404) matches a respective fingerprint of the cached message. And, if a predetermined number of the fingerprints of the outbound message are found to have a respective match in the fingerprints of the cached message, the cached message is determined to match the outbound message. If one or more matching cached messages are identified, the process 400 proceeds to step 410. Otherwise, the process 400 proceeds to step 420.

At step 410, the deduplicator 205 retrieves (from the cache structure identified at step 406), the cached message that is the most similar to the outbound message. In instances when only one cached message is found (at step 408) to match the outbound message, the only one cached message is retrieved. In instances in which more than one cached message is found to match the outbound message, the matching message which has the highest number of fingerprints that match the fingerprints of the outbound message is retrieved.

At step 412, the deduplicator 205 identifies shared regions between the outbound message and the cached message (retrieved at step 410). As noted above, each fingerprint of the outbound message is generated based on a different region of the payload message. A matching fingerprint of the outbound message may be a fingerprint that matches a respective fingerprint of the cached message (retrieved at step 410). And a shared region between the outbound message and the cached message may be a region that is used as a basis for generating any of the matching fingerprints of the outbound message. A shared region, in other words, may be a sequence of bits that is present in both the outbound message and the cached message (identified at step 410).

At step 414, the deduplicator 205 attempts to consolidate one or more of the shared regions. For instance, if a first shared region includes message bits 0 through 31 of the outbound message and a second shared region includes bits 16 through 47 of the outbound message, consolidating the first and second shared regions may include identifying a shared region that spans bits 0 through 47 of the outbound message. In other words, the identification of a consolidated region may include identifying a continuous sequence of bits of the payload of the outbound message, which corresponds to a set of overlapping shared regions. After step 414 is completed, some of the shared regions (identified at step 412) may be merged into a single shared region (provided that they occupy a continuous portion of the payload of the outbound message).

At step 416, each of the shared regions (identified at steps 412 and/or 414) in the payload of the outbound message is replaced with a token. It will be recalled that a shared region is a sequence of bits in the payload of the outbound message, which is also present in the payload of the cached message (retrieved at step 412). A token may be a word (e.g., a set of bits). Additionally or alternatively, the token may be shorter than the shared region it replaces. The token may identify the start of the shared region and the end of the shared region. The start of the shared region may be the position, within the payload of the cached message (retrieved at step 410), of the first bit of the shared region. The end of the shared region may be the position, within the payload of the cached message (retrieved at step 412), of the last bit of the shared region.

At step 418, the deduplicator 205 inserts an identifier of the cached message (retrieved at step 410) into the outbound message. According to the present example, the identifier of the cached message is inserted into one of the headers of the outbound message. However, alternative implementations are possible in which the identifier is appended to the payload of the cached message. When the cached message is retrieved at another device, the other device may use the identifier to retrieve a local copy of the cached message. Then, the other device may replace any token in the outbound message with a section of the cached message that is identified by the token. In other words, the identifier would notify the other device that there are tokens that need to be replaced.

At step 420, the outbound message is compressed.

At step 422, the deduplicator 205 detects if the outbound message needs to be stored in the cache structure associated with the destination of the outbound message. Specifically, the deduplicator 205 detects if the outbound message satisfies a predetermined condition. In some implementations, the predetermined condition may be satisfied if the outbound message contains a predetermined bit pattern. However, the present disclosure is not limited to any specific criterion for deciding whether to cache structure the outbound message or not. If the outbound message needs to be stored in the cache structure, the process 400 proceeds to step 424. Otherwise, the process 400 proceeds to step 428.

At step 424, the outbound message and the fingerprints of the outbound message (generated at step 402) are stored in the cache structure that is associated with the outbound message (e.g., the cache structure identified at step 406 or created at step 407).

At step 426, a cache message indicator is inserted into the outbound message. The cache message indicator may include any number, string, or alphanumerical string, which is indicative that the outbound message has been cached on the device that generated the message (i.e., the computing device 200). When the outbound message is received at another device, the cache structure message indicator would notify the other device that it needs to cache locally a copy of the outbound message.

At step 428, the outbound message is sent to its destination. In some implementations, to send the outbound message, the deduplicator 205 may provide the outbound message to a layer in the protocol stack 207 for transmission to the destination of the outbound message.

Figure 5:
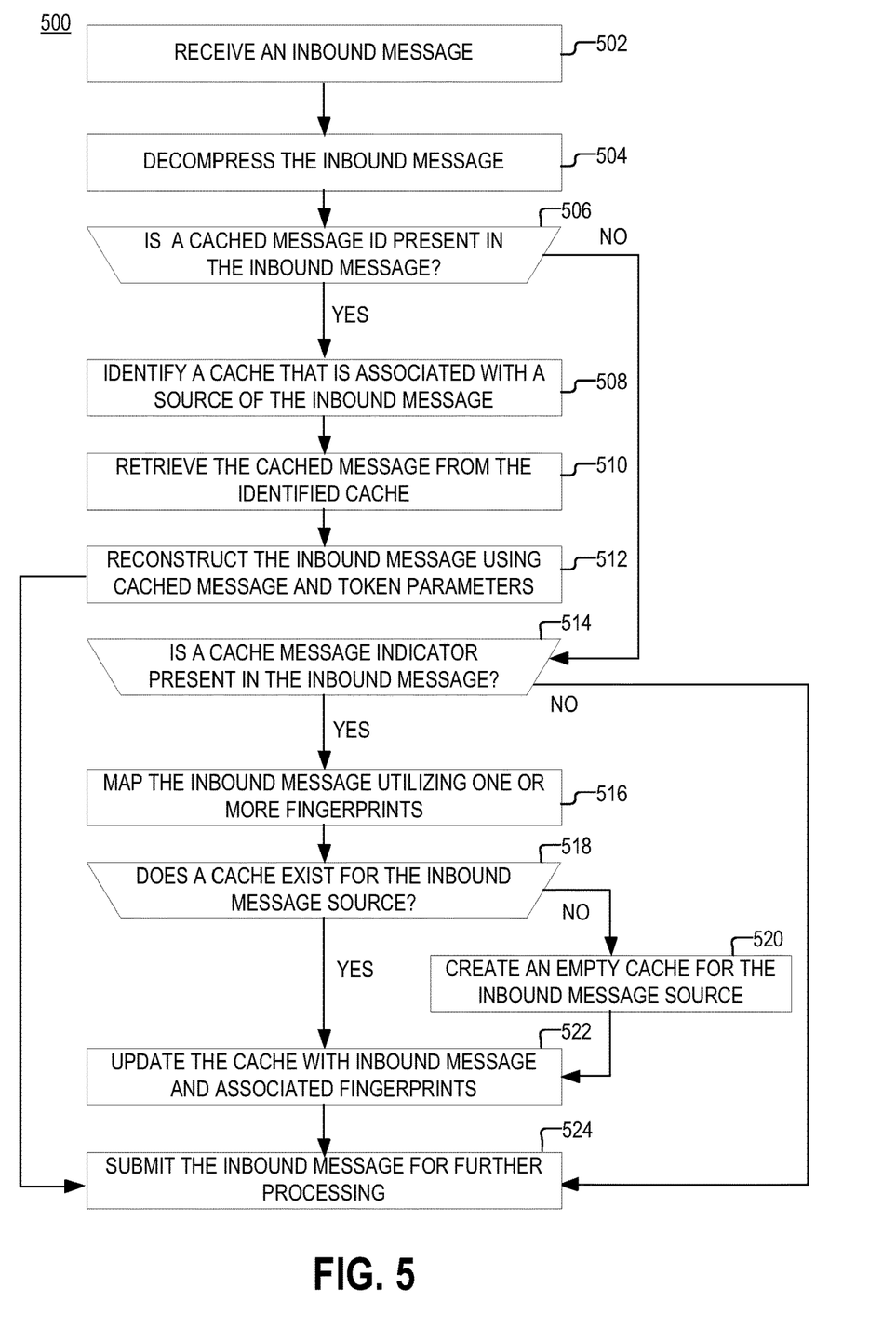
FIG. 5 is a flowchart of an example of a process, according to the present disclosure.

FIG. 5 is a flowchart of an example of a process 500, according to aspects of the disclosure.

At step 502, the deduplicator 205 receives an inbound message. The inbound message is an application-layer message that is generated by another device (i.e., a computing device other than the computing device 200). The inbound message is destined for application 203. The inbound message is received by the computing device 200 over communications network 106. The inbound message may be provided to the deduplicator 205 by a layer in the protocol stack 207.

At step 504, the inbound message is decompressed.

At step 506, the deduplicator 205 detects if the inbound message includes a cached message identifier. The cached message identifier may be the same or similar to the identifier that is inserted at step 418 of the process 400. The cached message identifier may identify a cached message that is used as a basis for performing deduplication on the inbound message by the device from which the inbound message is received. If the inbound message includes a cached message identifier, the process 500 proceeds to step 508. Otherwise, the process 500 proceeds to step 514.

At step 508, the deduplicator 205 identifies a cache structure 209 that is associated with the source of the inbound message. As noted above, the cache structure 209 may be one associated with the application that generated the inbound message and/or a flow which the inbound message is part of.

At step 510, the deduplicator 205 retrieves, from the identified cache structure 209, a cached message associated with the identifier (detected at step 506).

At step 512, the deduplicator 205 reconstructs the inbound message. Reconstructing the inbound message may include identifying one or more tokens that are inserted in the payload of the inbound message and replacing each of the tokens with a corresponding region of the payload cached message (retrieved at step 508). As noted above, the start and end of the region that is used to replace a token may be identified by the token.

At step 514, the deduplicator 205 detects if the inbound message includes a cache message indicator. The cache message indicator may be the same or similar to the cache message indicator that is inserted at step 426 of the process 400. If the inbound message includes a cache message indicator, the process 500 proceeds to step 516. Otherwise, the process 500 proceeds to step 524.

At step 516, the deduplicator 205 generates a plurality of fingerprints. In some implementations, each of the fingerprints may be generated by using a rolling hashing function. Additionally or alternatively, in some implementations, each of the fingerprints may be a Rabin fingerprint. Additionally or alternatively, in some implementations, each of the fingerprints may be generated based on a different region of the payload of the outbound message.

At step 518, the deduplicator 205 detects if a cache structure 209 is available in the memory 204, which is associated with the source of the inbound message. If a cache structure 209 is available, the process 500 proceeds to step 520. Otherwise, the process 500 proceeds to step 522.

At step 520, the deduplicator 205 creates an empty cache structure 209, which is associated with the source of the inbound message.

At step 522, the deduplicator 205 stores the inbound message and the fingerprints (created at step 516) in the cache structure that is associated with the source of the inbound message (i.e., the cache structure identified at step 518 or created at step 520).

At step 524, the inbound message is submitted for further processing to another component of the computing device 200. In some implementations, at step 524, the deduplicator 205 may provide the message to the application 203.

Figure 6:
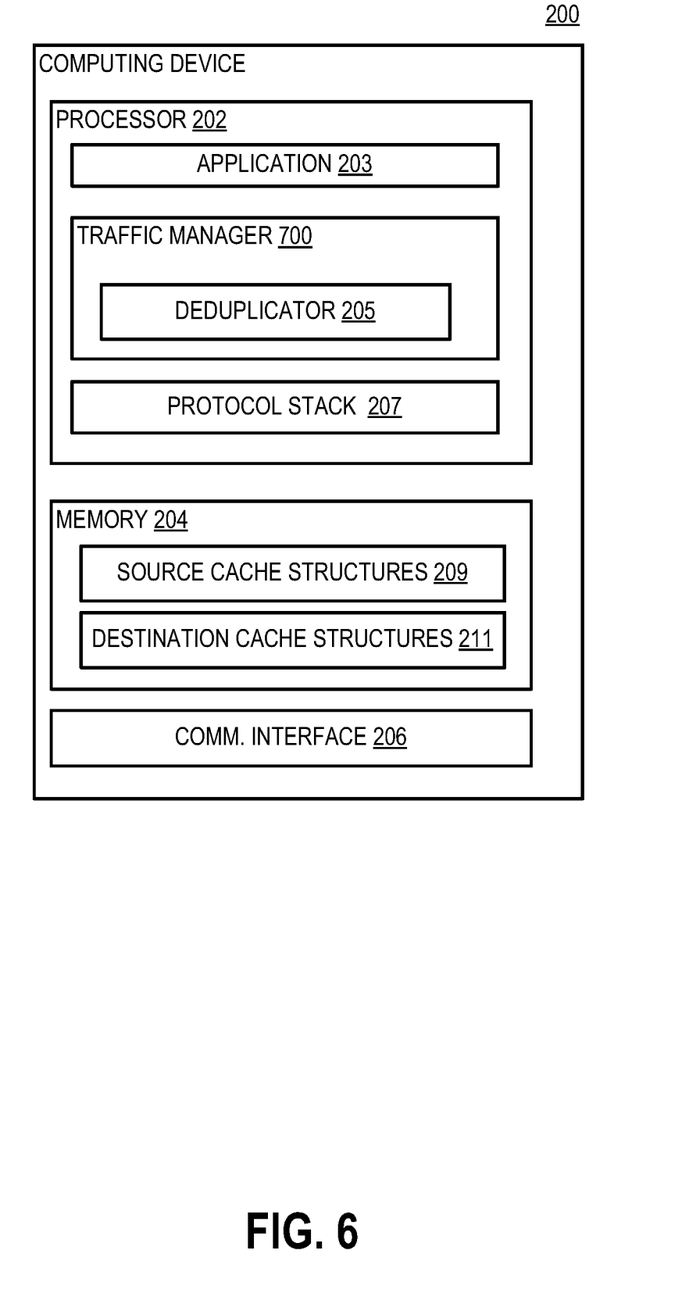
FIG. 6 is a diagram of an example of a computing device, according to aspects of the disclosure.

FIG. 6 illustrates an example of the computing device 200, in accordance with another implementation. In this implementation, the deduplicator 205 is integrated into a traffic manager 700. The traffic manager 700 may be interposed between one or more applications that are executed on the computing device 102 and one or more protocol stacks that are available on the computing device 102. The traffic manager 700 may be configured to optimize, at the application-layer level, traffic that is originating from one or more applications that are executed on the computing device 200.

Figure 7:
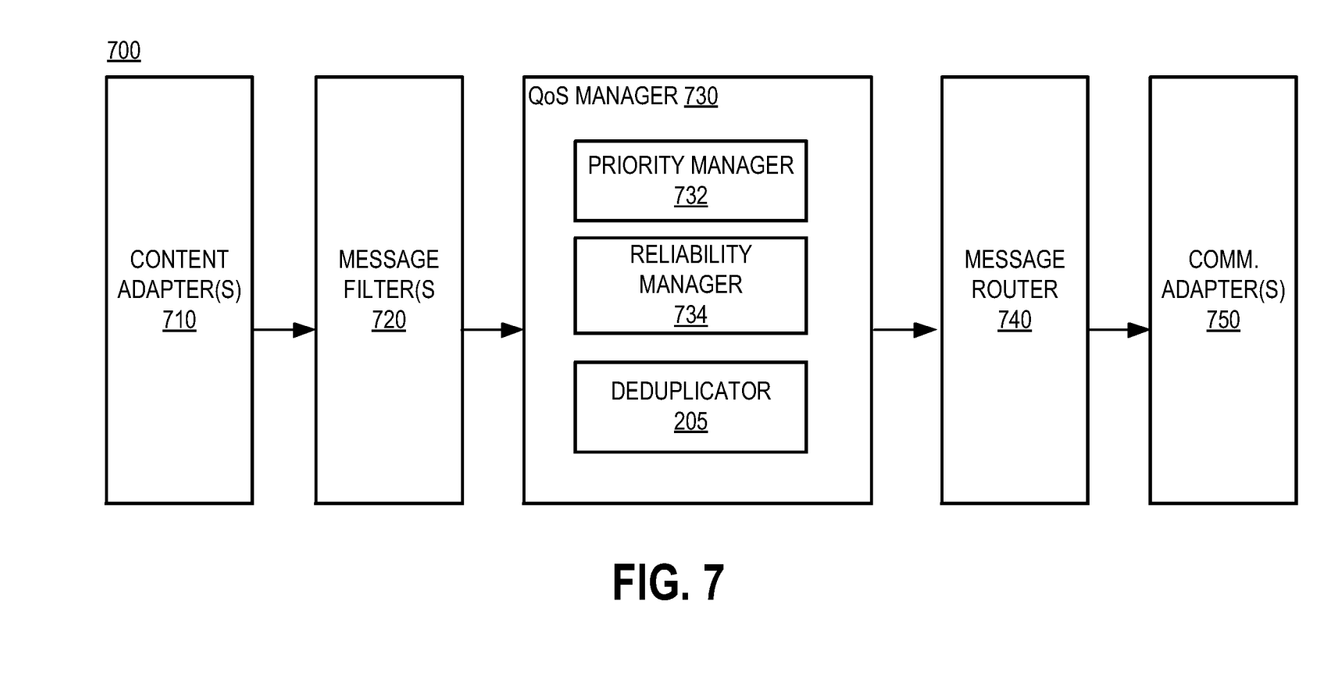
FIG. 7 is a diagram of an example of a traffic manager, according to aspects of the disclosure.

FIG. 7 is a diagram of the traffic manager 700, according to aspects of the disclosure. As illustrated, the traffic manager 700 may include one or more content adapters 710, one or more message filters 720, a quality-of-service (QoS) manager 730, a message router 740, and communications adapters 750. In operation, each of the content adapters 710 may be configured to interface the traffic manager 700 with a different application that is executed on the computing device 200. Each of the message filters 720 may filter messages that are incoming or outgoing from the content adapters. The QoS manager 730 may process messages that are incoming or outgoing from the content adapters to ensure a desired QoS for the messages. The QoS manager 730 may include a priority manager 732, a reliability manager 734, and the deduplicator 205. The priority manager 732 may be configured to implement logic for according desired levels of priority to messages that are received at the QoS manager 730, and the reliability manager 734 may include logic for ensuring reliable transmission of messages. The message router 740 may include logic for selecting a transmission path for messages that are outgoing from the computing device 200. And the communications adapters 750 may include logic for interfacing (directly or indirectly) the traffic manager 700 to hardware communications interfaces (e.g., a radio transmitter, an Ethernet interface, a Bluetooth interface, etc.) that are available on the computing device 200.

FIGS. 1-7 are provided as an example only. At least some of the steps discussed with respect to FIGS. 1-7 may be performed in parallel, in a different order, or altogether omitted. As used in this application, the word "exemplary" is used herein to mean serving as an example, instance, or illustration.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the disclosure and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed disclosure. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed disclosure. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed disclosure.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. For the purposes of this description, the terms "cache" and "cache structure" are used interchangeably.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed disclosure might be made by those skilled in the art without departing from the scope of the following claims.

The invention claimed is:

1. A method for use in a computing device having a memory and a processor that is operatively coupled to the memory, the method comprising:
   obtaining an outbound message, the outbound message being an application-layer message, the outbound message being generated by a first application that is executed by the processor;
   generating a plurality of first fingerprints based on the outbound message, each of the first fingerprints being generated based on a different portion of the outbound message;
   detecting, based on the plurality of first fingerprints, whether a first cached message is stored in the memory that matches the outbound message;
   when the first cached message is stored in the memory, including an identifier of the first cached message in the outbound message, replacing a first region of a payload of the outbound message with a first token, the first region of the payload of the outbound message including a sequence of bits that is also found the first cached message, and transmitting the outbound message to a remote device; and
   when the first cached message is not stored in the memory, transmitting the outbound message to the remote device, the outbound message being transmitted without replacing any portion of the payload of the outbound message with a token,
   wherein the plurality of first fingerprints is generated by a deduplicator that is integrated into an application layer of a protocol stack of the computing device, and
   wherein detecting whether the first cached message is stored in the memory includes: (i) identifying a cache structure that stores only messages that are destined for a second application for which the outbound message is destined, the cache structure being part of a plurality of cache structures that are stored in the memory, each of the plurality of cache structures being dedicated to storing data destined for a different application, and (ii) performing a search of the identified cache structure to determine whether the cache structure includes a cached message that is associated with a predetermined number of second fingerprints that match respective ones of the plurality of first fingerprints.

2. The method of claim 1, wherein the outbound message is transmitted by the protocol stack, and, when the first cached message is stored in the memory, the first region of the payload of the outbound message is replaced with the first token by the application layer of the protocol stack.

3. The method of claim 1, wherein the outbound message is transmitted by the protocol stack, and, when the first cached message is stored in the memory, the first region of the payload of the outbound message is replaced with the first token by the deduplicator.

4. The method of claim 1, further comprising, when the first cached message is not stored in the memory, caching the outbound message and inserting in the outbound message a cached message indicator, the cached message indicator being inserted before the outbound message is transmitted to the remote device.

5. The method of claim 1, further comprising:
   obtaining an inbound message, the inbound message including a message that is generated by the remote device, the inbound message including an application-layer message that is destined for the first application;
   detecting whether the inbound message includes a cached message identifier;
   when the inbound message includes a cached message identifier, retrieving a second cached message that is identified by the cached message identifier, replacing a second token that is part of a payload of the inbound message with a second region of the second cached message, and forwarding the inbound message for further processing by the first application; and
   when the inbound message does not include a cached message identifier, forwarding the inbound message for further processing by the first application.

6. The method of claim 1, further comprising:
   obtaining an inbound message, the inbound message including a message that is generated by the remote device, the inbound message including an application-layer message that is destined for the first application;
   detecting whether the inbound message includes a cache message indicator; and
   caching the inbound message when the inbound message includes a cache message indicator, wherein the inbound message is cached only when the inbound message includes a cache message indicator.

7. A system, comprising:
   a memory; and
   a processor operatively coupled to the memory, the processor being configured to perform the operations of:
   obtaining an outbound message, the outbound message being an application-layer message, the outbound message being generated by a first application that is executed by the processor;
   generating a plurality of first fingerprints based on the outbound message, each of the first fingerprints being generated based on a different portion of the outbound message;
   detecting, based on the plurality of first fingerprints, whether a first cached message is stored in the memory that matches the outbound message;
   when the first cached message is stored in the memory, including an identifier of the first cached message in the outbound message, replacing a first region of a payload of the outbound message with a first token, the first region of the payload of the outbound message including a sequence of bits that is also found the first cached message, and transmitting the outbound message to a remote device; and
   when the first cached message is not stored in the memory, transmitting the outbound message to the remote device, the outbound message being transmitted without replacing any portion of the payload of the outbound message with a token,
   wherein the plurality of first fingerprints is generated by a deduplicator that is integrated into an application layer of a protocol stack that is executed by the processor, and
   wherein detecting whether the first cached message is stored in the memory includes: (i) identifying a cache structure that stores only messages that are destined for a second application for which the outbound message is destined, the cache structure being part of a plurality of cache structures that are stored in the memory, each of the plurality of cache structures being dedicated to storing data destined for a different application, and (ii) performing a search of the identified cache structure to determine whether the cache structure includes a cached message that is associated with a predetermined number of second fingerprints that match respective ones of the plurality of first fingerprints.

8. The system of claim 7, wherein the outbound message is transmitted by the protocol stack, and, when the first cached message is stored in the memory, the first region of the payload of the outbound message is replaced with the first token by the application layer of the protocol stack.

9. The system of claim 7, wherein the outbound message is transmitted by the protocol stack, and, when the first cached message is stored in the memory, the first region of the payload of the outbound message is replaced with the first token by the deduplicator.

10. The system of claim 7, wherein, when the first cached message is not stored in the memory, the processor is further configured to perform the operations of: caching the outbound message and inserting in the outbound message a cached message indicator, the cached message indicator being inserted before the outbound message is transmitted to the remote device.

11. The system of claim 7, wherein the processor is further configured to perform the operations of:
obtaining an inbound message, the inbound message including a message that is generated by the remote device, the inbound message including an application-layer message that is destined for the first application;
detecting whether the inbound message includes a cached message identifier;
when the inbound message includes a cached message identifier, retrieving a second cached message that is identified by the cached message identifier, replacing a second token that is part of a payload of the inbound message with a second region of the second cached message, and forwarding the inbound message for further processing by the first application; and
when the inbound message does not include a cached message identifier, forwarding the inbound message for further processing by the first application.

12. The system of claim 7, wherein the processor is further configured to perform the operations of:
obtaining an inbound message, the inbound message including a message that is generated by the remote device, the inbound message including an application-layer message that is destined for the first application;
detecting whether the inbound message includes a cache message indicator; and
caching the inbound message when the inbound message includes a cache message indicator, wherein the inbound message is cached only when the inbound message includes a cache message indicator.

13. A non-transitory computer-readable medium that is configured to store one or more processor-executable instructions, which, when executed by at least one processor, further cause the at least one processor to perform the operations of:
obtaining an outbound message, the outbound message being an application-layer message, the outbound message being generated by a first application that is executed by the processor;
generating a plurality of first fingerprints based on the outbound message, each of the first fingerprints being generated based on a different portion of the outbound message;
detecting, based on the plurality of first fingerprints, whether a first cached message is stored in a memory that matches the outbound message;
when the first cached message is stored in the memory, including an identifier of the first cached message in the outbound message, replacing a first region of a payload of the outbound message with a first token, the first region of the payload of the outbound message including a sequence of bits that is also found the first cached message, and transmitting the outbound message to a remote device; and
when the first cached message is not stored in the memory, transmitting the outbound message to the remote device, the outbound message being transmitted without replacing any portion of the payload of the outbound message with a token,
wherein the plurality of first fingerprints is generated by a deduplicator that is integrated into an application layer of a protocol stack that is executed by the at least one processor, and
wherein detecting whether the first cached message is stored in the memory includes: (i) identifying a cache structure that stores only messages that are destined for a second application for which the outbound message is destined, the cache structure being part of a plurality of cache structures that are stored in the memory, each of the plurality of cache structures being dedicated to storing data destined for a different application, and (ii) performing a search of the identified cache structure to determine whether the cache structure includes a cached message that is associated with a predetermined number of second fingerprints that match respective ones of the plurality of first fingerprints.

14. The non-transitory computer-readable medium of claim 13, wherein the outbound message is transmitted by the protocol stack, and, when the first cached message is stored in the memory, the first region of the payload of the outbound message is replaced with the first token by the application layer of the protocol stack.

15. The non-transitory computer-readable medium of claim 13, wherein the outbound message is transmitted by the protocol stack, and, when the first cached message is stored in the memory, the first region of the payload of the outbound message is replaced with the first token by the deduplicator.

16. The non-transitory computer-readable medium of claim 13, wherein the one or more processor-executable instructions, when executed by the processor, further cause the processor to perform the operations of: when the first cached message is not stored in the memory, caching the outbound message and inserting in the outbound message a cached message indicator, the cached message indicator being inserted before the outbound message is transmitted to the remote device.

17. The non-transitory computer-readable medium of claim 13, wherein the one or more processor-executable instructions, when executed by the processor, further cause the processor to perform the operations of:
obtaining an inbound message, the inbound message including a message that is generated by the remote device, the inbound message including an application-layer message that is destined for the first application;
detecting whether the inbound message includes a cached message identifier;
when the inbound message includes a cached message identifier, retrieving a second cached message that is identified by the cached message identifier, replacing a second token that is part of a payload of the inbound message with a second region of the second cached message, and forwarding the inbound message for further processing by the first application; and
when the inbound message does not include a cached message identifier, forwarding the inbound message for further processing by the first application.

\* \* \* \* \*